Feb. 4, 1930.   W. A. ADAMS   1,745,396
ELECTRICAL FIXTURE
Filed Feb. 12, 1927   3 Sheets-Sheet 1

INVENTOR
Walter A. Adams
BY
J. H. Simms
his ATTORNEY

Feb. 4, 1930. W. A. ADAMS 1,745,396
ELECTRICAL FIXTURE
Filed Feb. 12, 1927  3 Sheets-Sheet 2
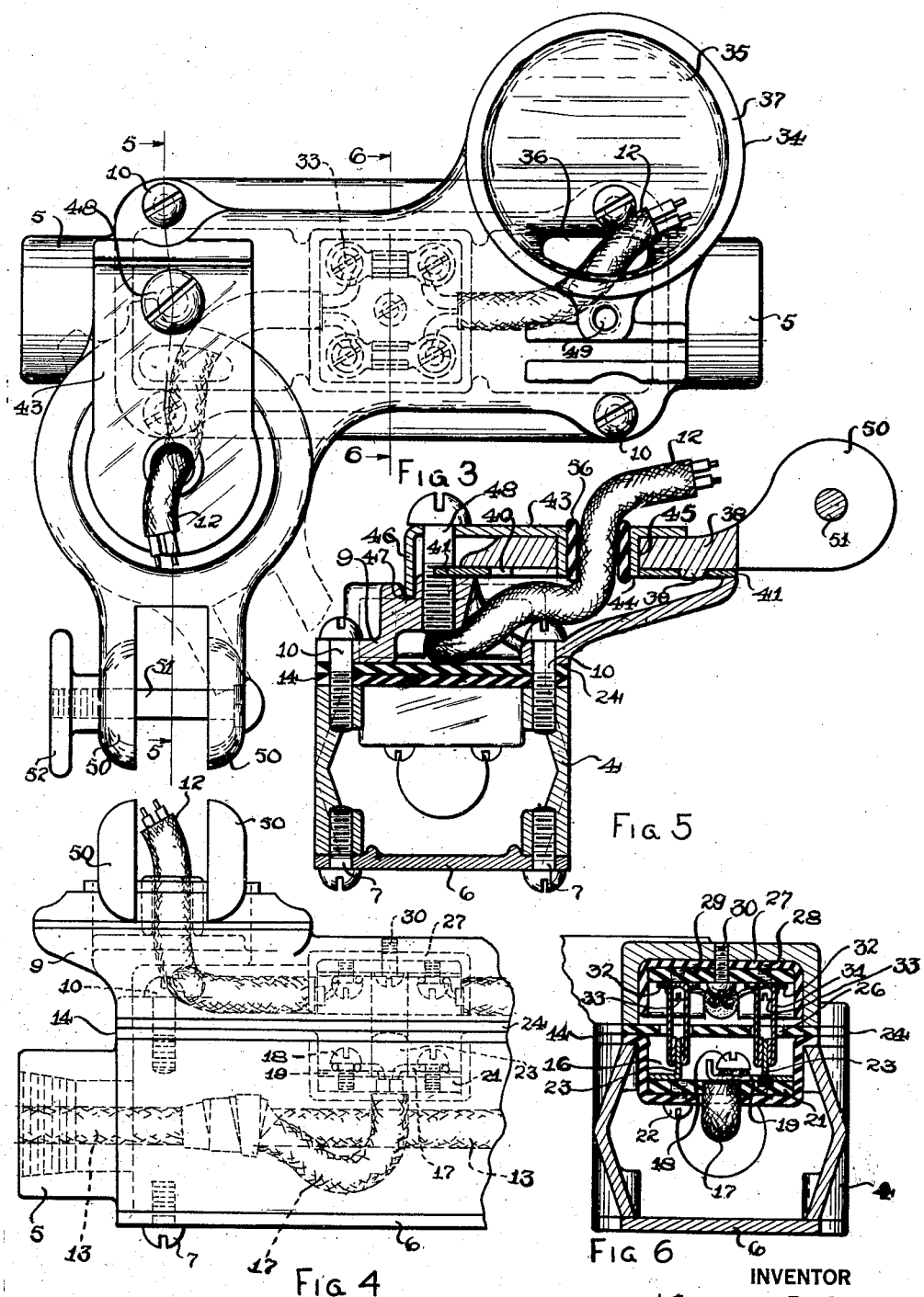
INVENTOR
Walter A. Adams
BY
his ATTORNEY

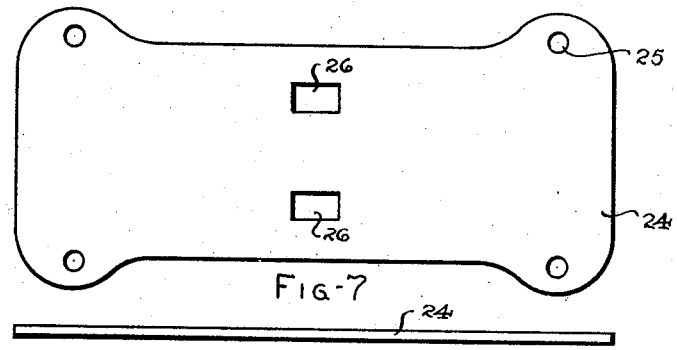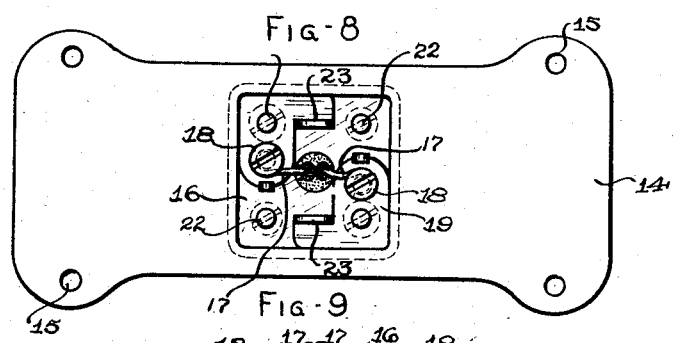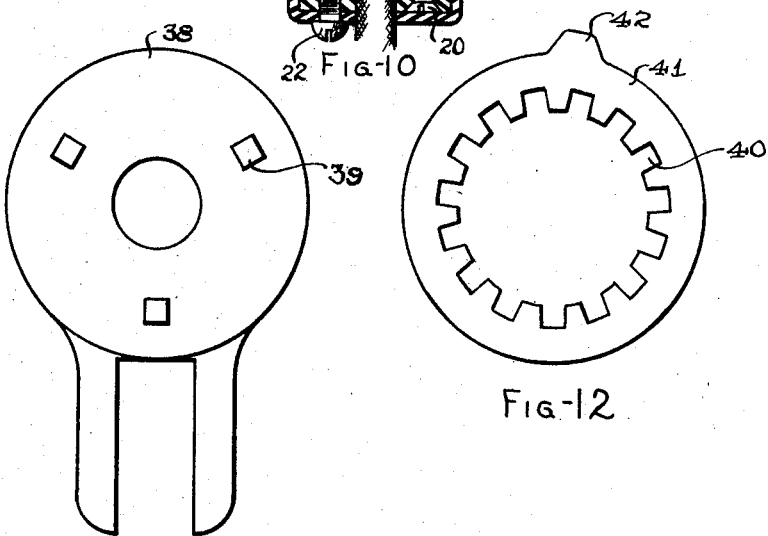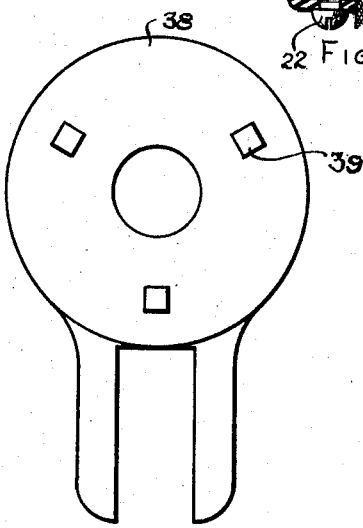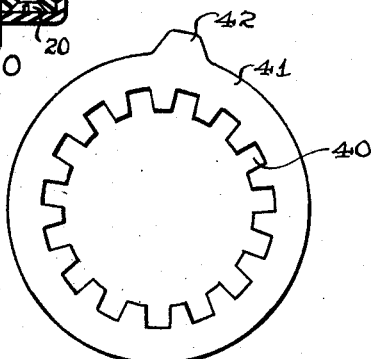

Patented Feb. 4, 1930

1,745,396

UNITED STATES PATENT OFFICE

WALTER A. ADAMS, OF ROCHESTER, NEW YORK

ELECTRICAL FIXTURE

Application filed February 12, 1927. Serial No. 167,846.

The present invention relates to electrical fixtures and an object thereof is to provide means whereby an electrical fixture may be supported from the cover plate of an outlet box. Another object of the invention is to provide a construction in which an outlet box and its cover plate carry cooperating contacts so constructed and arranged that upon the removal of the cover plate with its contacts another cover plate without contacts may be fitted thereto without producing electrical disturbances. Another object of the invention is to provide a novel means of mounting separable electrical contacts upon outlet boxes of common construction, so that electrical connection with the outlet box may be readily made or broken. Still another object of the invention is to support electrical contacts by an insulating member between the outlet box and its cover. A further object of the invention is to provide an outlet box cover so constructed that an electrical fixture may readily be supported by the cover. Still another object of the invention is to make it possible to readily connect or disconnect an electrical fixture with an outlet box so that the assistance of a skilled electrician for this purpose will be unnecessary. Still another and further object of the invention is to provide a novel means of securing two coupling members in pivotal relation.

To these and other ends, the invention consists of certain parts and combinations of parts, all of which will be hereinafter described, the novel features being pointed out in the appended claims.

In the drawings:

Fig. 3 is an enlarged plan view of an outlet box with the present invention incorporated therein, one of the coupling members being removed;

Fig. 4 is a fragmentary section of one end of an outlet box equipped with the present invention;

Fig. 5 is a section on the line 5—5, Fig. 3;

Fig. 6 is a section on the line 6—6, Fig. 3;

Fig. 7 is a plan view of one of the insulating plates;

Fig. 8 is an edge view of the same plate;

Fig. 9 is a plan view of the insulating plate which carries the contacts;

Fig. 10 is a longitudinal section through the plate shown in Fig. 9;

Fig. 11 is a face view of the under side of the coupling member which turns on the arm of the cover plate; and Fig. 12 is a plan view of the ring for limiting movement between the two members of the coupling.

Figure 1:
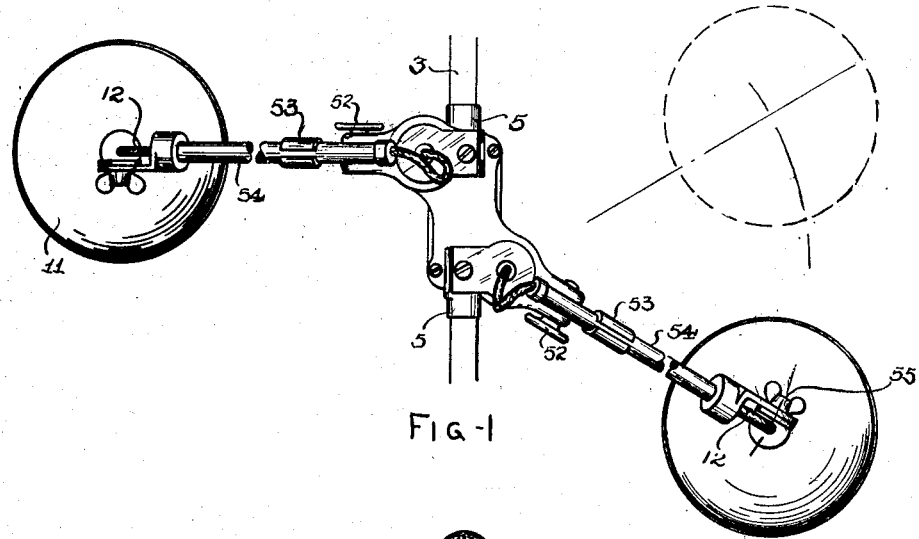
Fig. 1 is a plan view of an electrical fixture constructed in accordance with this invention.
Figure 2:
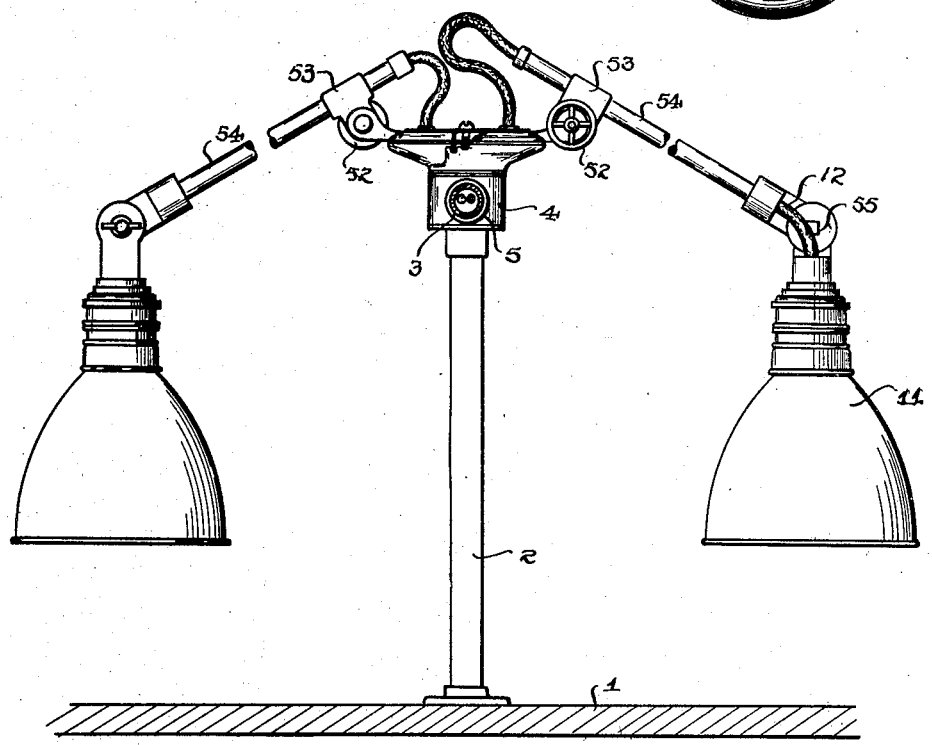
Fig. 2 shows the structure in end elevation.

In the illustrated embodiment of the invention, 1 indicates a table from which a standard 2 rises, supporting a conductor conduit 3. In this conduit is arranged an outlet box 4 which has its opposite ends provided with internally threaded nipples 5 with which the conduit 3 connects. This outlet box also has two opposite walls formed with openings. In this instance, one of these openings is closed by a cover plate 6 which is held in position on the outlet box by bolts 7 passing through the cover plate and anchored in the outlet box.

The opposite side of the outlet box 4 is closed by a cover member 9 secured in place by bolts 10. This cover member acts as a support for an electrical fixture, such as the lamp 11, and also as an outlet for the conductors 12 leading to the lamp. In this embodiment, this cover plate also carries contacts which detachably engage with contacts carried by the outlet box for the purpose of establishing electrical connection between the line conductor 13 and the conductor 12 leading to electrical device 11.

With the end in view of supporting contacts on the outlet box, there may be provided a plate 14 preferably made of insulating material and provided with openings 15 which will align with the openings in the cover plate 9 through which the bolts 10 pass so that the bolts may have the double function of securing the cover plate and this insulating contact support, the latter having its edges positioned between the cover plate and the box. In its upper face, this support 14 has a depression or pocket 16 at the center of which is formed an opening through which the conductors 17 connecting to the main line conductors 13 pass, the conductors 17 being secured by binding screws 18 to contact plates 19 which by screws 20 are secured to an insulating plate 21 at the bottom of the pocket 16, this insulating plate being held in the pocket by screws 22. The conductor plates 19 have contact points 23 turned laterally therefrom and extending upwardly in the pocket but not above the top or outer face of the supporting plate 14, another insulating plate 24 having bolt openings 25 through which the bolts 10 pass acts as a cover member for the insulating contact support and is provided with slots or openings 26 opposite the contact 23 so that said contacts may be reached through the openings 26. It is apparent that if the insulating cover plate 24 is not provided with the opening 26, a cover plate like 6 may be secured over the insulating cover plate 24 and will close up the outlet box while maintaining the latter in a condition to have an electrical fixture connected thereto at will without calling in the assistance of an electrician.

The cover member 9, in this instance, has on its inner face a pocket 27 receiving a cup shaped insulator 28 in which is received an insulating disk 29, the disk 29 and the cup shaped insulator being held in the pocket by a screw 30. Two pairs of spring contacts 31 each pair being extended from a conductor plate 32 are secured in the pocket to project therefrom, this being obtained by screws 33 passing through the conductor plates 32. The two pairs of spring contacts 31 are adapted to cooperate with the contact points 23 on the outlet box, the spring contacts 31 being passed through the openings 26 in the insulating plate 24 in order to establish electrical connection between the outlet box and the electrical fixtures carried by the cover of the outlet box. This arrangement makes it possible for a factory or other place where this invention may be installed to shift the electrical fixtures at will without calling in skilled electricians, as the connection between the electrical fixture and the outlet box may be broken by merely removing the cover plate 9.

With the end in view of supporting an electrical fixture from a cover of the outlet box, said cover has, in this instance two arms 34 projected from opposite sides thereof near opposite ends of the cover plate. These arms are disk like in formation and have pockets 35 formed in the top spaces thereof and these pockets through openings 36 connect with the pocket 27 so that the conductors 12 from the lamp 11 may lead from the pocket 27 to the pocket 35 the conductors being secured by the screws 33 to the conductor plates 32. The upper surface of each arm 34, in this instance, is flat as in 37 and extends about the pocket 35.

Supported by each of these arms 34 is a coupling member having a disk shaped portion 38 the under side of which is provided with a series of radially arranged lugs 39. These lugs are adapted to be engaged by the walls of recesses 40 formed in the inner periphery of a stop ring 41 which carries a stop 42 for cooperation with a stop on the cover member to be hereinafter described. This coupling member 38 is mounted to turn on an arm 34 of the cover plate and to this end there is provided a combined bearing and holding member 43 having a tubular cylindrical bearing 44 depending on the underside thereof and extending through an opening 45 in the coupling member 38 so that the walls of said opening 45 turn on the walls of this tubular bearing member 44 in the swinging of the coupling member on the arm 34. The combined holding bearing member has its under face engaging the upper face of the coupling member 38 and in order that the coupling member 38 may be held firmly toward the arm 34, provision is made for adjustably supporting the combined holding and bearing member. To this end said member has a laterally turned portion 46 mounted to rock in a depression or pocket 47 formed in the cover plate 9 at the inner end of the arm. Between this bearing portion on the cover plate and the engagement of the combined holding and bearing member with the coupling member 38, the combined holding and bearing member has an opening through which is passed a screw 48 anchored at 49 in the cover plate. It is apparent that the adjustment of the screw 48 shifts the combined holding and bearing member 43 and varies the pressure between the coupling member 38 and the arm 34 on its cover plate 9. This screw 48 also serves as a stop or abutment 42 on the ring 41 and determines the angle of movement of the coupling member 38 on the arm 9, this angle being adjustable by shifting the ring 41 on the coupling member 38 through the bringing of the walls of the recesses of different recesses 40 in engagement with the lugs or projections 49.

The coupling member 38 before mentioned has two ears 50 through which a bolt 51 having a thumb nut 52 thereon passes. On this bolt is mounted to turn a split clamp 53 through which is adjustable a conductor tube 54 having its outer end pivotally supporting the lamp at 55 and its inner end open. The conductors 12 extend from the lamp through this tube 54, through the tubular bearing 44 into the pocket 35 of the arm on the cover plate 9 and connects with both pairs of contacts 31. Where the conductors 12 pass through the tubular bearing 44 an insulating sleeve 56 is arranged which prevents any wearing action on the conductors 12 at this point and the conductors 12 pass through the coupling 38 in line with the axis of turning of the coupling member 38 so that any wearing action at this point is small.

From the foregoing it will be seen that there has been provided an outlet box for conductor conduits in which the outlet box and the cover are provided with electrical contacts maintained in engagement when the cover is fitted to the outlet box and broken when the cover is removed from the outlet box. The contacts in the outlet box are so arranged that a cover without contacts may be fitted to the outlet box when it is not desired to connect with the contacts. A novel means is provided for supporting the contacts in the outlet box comprising an insulating member arranged between the outlet box and the cover. The insulating member has a pocket in which the contacts are arranged so as not to project beyond the surface of said insulating member. The cover carries contacts adapted to project into the outlet box to engage with the contacts therein. The cover also carries integrally formed supporting arms for electrical fixtures each arm having a passageway leading therefrom to the contacts on the cover. A novel means is provided for supporting a coupling member on the arm of the cover plate.

What I claim as my invention and desire to secure by Letters Patent is:

1. The combination with an outlet box having an opening for connection with a conductor conduit and an opening in one side, of an insulating plate arranged over the side opening and provided with a pocket, contacts arranged in said pocket, a cover at least coextensive in area with said outlet box opening and arranged to extend completely over the insulating plate, contacts supported in fixed positions on the cover and adapted to extend into the pocket and to engage detachably with the contacts in the pocket and means for holding the cover detachably but rigidly to the outlet box.

2. An outlet box having an opening for connecting with a conductor conduit and an outlet in one side, of a cover for said opening, having a bearing formed thereon means detachably securing the cover to the outlet box, a coupling member mounted to turn on said bearing, said cover having an opening leading therethrough to the interior of the outlet box the coupling member having an opening for the passage of a conductor concentric with its axis of turning on the outlet box and separate means for pivotally securing the coupling member to the cover.

3. The combination with an outlet box having an opening in the side wall, of an insulating member covering said opening and formed with a depressed portion providing a pocket in the outer face of the insulating member and projecting into the outlet box, contacts mounted in said pocket, and a cover fitted over said insulating member and having contacts projecting from the face thereof into detachable engagement with the contacts in the pocket.

4. The combination with an outlet having an opening in one side, of contacts supported in the outlet box, an insulating member covering the open side of the outlet box and having openings exposing the contacts in the outlet box, and a cover fitted over the insulating member and having contacts projecting therefrom through the openings in the insulating member to cooperate with the contacts in the outlet box.

5. The combination with an outlet box having an opening in the side, of a cover for closing the opening in the side of the outlet box, two insulating members interposed between the cover and the outlet box, one of said insulating members having a depressed portion projecting into the outlet box and forming a pocket between the two members and the other said insulating members having openings leading to said pocket, contacts arranged in the pocket, and contacts carried by the cover and projecting into the pocket through the openings in the last mentioned insulating member to cooperate with the contacts in the pocket.

6. The combination with an outlet box having an opening in the side, of contacts carried by the outlet box, a cover for the outlet box having a pocket on its under side and a hollow supporting arm provided with an opening communicating with said pocket for a conductor, and contacts supported by the cover in said pocket and projecting from the inner face of the cover to cooperate with the contacts on the outlet box and a coupling member movably mounted on the supporting arm.

7. The combination with an outlet box having an opening in one side, of a cover for the opening in the side of the outlet box having an opening leading therethrough from the under side thereof means for securing the cover in a rigid position on the outlet box, a bearing formed on the cover on the outer face thereof about the opening, and a coupling member mounted to turn on the bearing and having an opening therethrough communicating with the opening in the cover and axially alined with the axis of turning on the cover plate.

8. The combination with an outlet box having an opening in one side, of a cover for said opening having a chamber formed in its upper side and having an annular bearing surrounding said chamber, the cover having an opening leading therethrough from said chamber to the under side of the cover means for securing the cover in a rigid position on the outlet box, and a coupling member mounted to turn on the annular bearing.

9. The combination with an outlet box having an opening in one side, of an insulating member arranged over said opening and provided with openings, contacts arranged within the outlet box and exposed through said openings, a cover, a fixture supporting arm projecting from the cover, contacts supported by the cover and adapted to project through the opening in the insulating member to contact with the contacts in the outlet box, said cover having a passage formed in its inner face and extending through the fixture supporting arm to lead a conductor from the contacts on the cover plate to said fixture supporting arm.

10. A coupling for electrical fixtures comprising two pivotally connected parts, one of which has an opening extending entirely therethrough and alined throughout its length with the axis of turning, a combined holding and pivoting member secured to the other part and having a portion engaging the first part about said opening on the side opposite the other part, said holding and pivoting member having also a tubular portion projecting into said opening, and a tubular insulator arranged in the tubular portion.

11. The combination with an outlet box having an opening for connecting with a conductor conduit and an opening in one of the side walls, of an insulated member covering said opening and having a depressed portion forming a pocket and projecting into said box, contacts arranged in said pocket, a second insulating member covering the first named insulating member and having openings arranged above the contacts in the pocket, a cover at least coextensive in area with said outlet box opening and secured over both insulating members, projecting contacts supported in fixed positions on the cover passed through the openings in the second named insulating member and detachably cooperating with the contacts in the pocket, and means for holding a cover detachably but rigidly to the outlet box.

12. The combination with an outlet box having an opening through which the outlet box connects with a conductor conduit, and an opening in the side, of a cover at least coextensive with and closing said opening, means detachably securing the cover to the outlet box against movement thereon, said means permitting the removal of the cover without removing the outlet box from its support, a coupling member supported entirely by the cover, means supported entirely by but separable from the cover for pivotally securing the coupling member to swing on the cover.

13. The combination with an outlet box having an opening for connecting with a conductor conduit and also having an opening in one side, of contacts arranged in said outlet box, an insulating member arranged over the opening in the outlet box and having two openings to expose the contacts in the outlet box, a cover secured over said insulating member and having a pocket formed in the latter and also an arm projecting therefrom, the cover having a passage on the under side thereof leading to said arm from the pocket, and contacts arranged in the pocket of the cover and projecting to pass through the openings of the insulating member in order to engage the contacts in the outlet box.

14. The combination with an outlet box having a chamber, and two openings in two walls at right angles to each other, one of said openings adapted to have a conductor passed therethrough into the box, and the other of said openings being substantially coextensive with the area of the chamber, of a cover member closing the last mentioned opening, screws securing said cover member against movement in its plane to said outlet box, said cover member having an integral supporting arm projecting from the face thereof opposite the outlet box and provided with an opening for a conductor leading from the inner face of the cover through said supporting arm.

15. The combination with an outlet box having a chamber and two openings in two walls at right angles to each other, one of said openings being adapted to have a conductor passed therethrough into the box and the other of said openings being substantially coextensive with the area of the chamber, of a cover member closing the last mentioned opening, and having an opening for a conductor extending therethrough to the outer face of the cover, screws securing said cover member to said outlet box, and a bearing formed on the outer face of the cover about said conductor opening.

16. The combination with an outlet box having means for securing it to a suitable support, a chamber and two openings in two walls at right angles to each other, one of said openings having associated with it means for connecting a conduit, and the other opening being substantially coextensive in area with the area of the chamber, of a cover for the second named opening at least coextensive with the area of the chamber, screws securing the cover to the outlet box so that the cover can be removed without removing the outlet box from its support, the cover having an opening therethrough from the interior of the box through which a conductor may be passed from the outlet box, and also having a bearing on the outer face thereof, and a coupling member mounted to turn on said bearing.

17. The combination with an outlet box having means for securing it to a suitable support, a chamber and two openings in two walls at right angles to each other, one of said openings having associated with it means for connecting a conduit, and the other opening being substantially coextensive in area with the area of the chamber, of a cover for the second named opening at least coextensive with the area of the chamber, screws securing the cover to the outlet box so that the cover can be removed without removing the outlet box from its support, the cover having an opening therethrough from the interior of the box through which a conductor may be passed from the outlet box, and also having a bearing on the outer face thereof, and a coupling member mounted to turn on said bearing, the bearing on the cover entirely surrounding the conductor opening, and the coupling member having an opening axially aligned with its turning axis for the passage of the conductor leading from the outlet box.

WALTER A. ADAMS.